US011085097B2

(12) United States Patent
Xu et al.

(10) Patent No.: US 11,085,097 B2
(45) Date of Patent: Aug. 10, 2021

(54) SELF-LUBRICATING ROLLING BEARING AND PREPARATION METHOD THEREFOR

(71) Applicant: Xi'an University of Technology, Shaanxi (CN)

(72) Inventors: Yang Xu, Shaanxi (CN); Guojun Yan, Shaanxi (CN); Baojian Liu, Shaanxi (CN)

(73) Assignee: Xi'an University of Technology, Shaanxi (CN)

( * ) Notice: Subject to any disclaimer, the term of this patent is extended or adjusted under 35 U.S.C. 154(b) by 115 days.

(21) Appl. No.: 16/327,884

(22) PCT Filed: Aug. 31, 2017

(86) PCT No.: PCT/CN2017/099793
§ 371 (c)(1),
(2) Date: Feb. 25, 2019

(87) PCT Pub. No.: WO2018/041170
PCT Pub. Date: Mar. 8, 2018

(65) Prior Publication Data
US 2019/0194771 A1 Jun. 27, 2019

(30) Foreign Application Priority Data
Aug. 31, 2016 (CN) .......................... 201610792612.8

(51) Int. Cl.
*C21D 9/40* (2006.01)
*C21D 1/32* (2006.01)
(Continued)

(52) U.S. Cl.
CPC ................ *C21D 9/40* (2013.01); *B22D 11/14* (2013.01); *C21D 1/20* (2013.01); *C21D 1/32* (2013.01);
(Continued)

(58) Field of Classification Search
CPC .. B22D 11/14; C21D 1/32; C21D 9/40; C22C 33/08; C22C 37/04; C22C 37/10; F16C 33/66; F16C 33/6696
(Continued)

(56) References Cited

U.S. PATENT DOCUMENTS 3,776,295 A   12/1973   Mola et al.
5,271,679 A   12/1993   Yamazumi et al.
(Continued)

FOREIGN PATENT DOCUMENTS

CN         87200694 U    1/1988
CN         1278563 A     1/2001
(Continued)

OTHER PUBLICATIONS

NPL: On-line translation of CN-103131937-A Jun. 2013 (Year: 2013).*

*Primary Examiner* — Jie Yang
(74) *Attorney, Agent, or Firm* — Novick, Kim & Lee, PLLC; Sang Ho Lee

(57) ABSTRACT

A self-lubricating rolling bearing is provided. The chemical compositions in the inner rings and the outer rings of bearing are 3.4-3.7% C, 2.7-2.9% Si, 0.3-0.5% Mn, 0.3-0.5% Cr, ≤0.05% S, ≤0.05% P, 0.03-0.045% Residual Mg, and the remainder Fe. The total percent of the chemical compositions is 100%. The material for the inner and outer rings of the rolling bearing introduced in the invention is austempered ductile iron (ADI). In the microstructure of ADI, the diameter of the graphite nodules is less than 0.02 mm, the number of graphite spheres per square millimeter is more than 400, and the microstructure of the metal matrix in the ADI can be showed clearly only when it is observed on the microscope with a magnification more than 500. Eventually, the self-lubricating rolling bearings are made from the ADI.

3 Claims, 5 Drawing Sheets

(51) Int. Cl.
  *C22C 37/06* (2006.01)
  *C22C 37/10* (2006.01)
  *C22C 37/08* (2006.01)
  *F16C 33/66* (2006.01)
  *B22D 11/14* (2006.01)
  *C21D 1/20* (2006.01)
  *C22C 33/08* (2006.01)
  *C22C 37/04* (2006.01)

(52) U.S. Cl.
  CPC .............. *C22C 33/08* (2013.01); *C22C 37/04* (2013.01); *C22C 37/06* (2013.01); *C22C 37/08* (2013.01); *C22C 37/10* (2013.01); *F16C 33/66* (2013.01); *F16C 33/6696* (2013.01)

(58) Field of Classification Search
  USPC .......................................................... 148/522
  See application file for complete search history.

(56) References Cited

U.S. PATENT DOCUMENTS

| | | | |
|---|---|---|---|
| 2002/0121020 A1* | 9/2002 | Obara | B24B 39/02 29/898.066 |
| 2010/0215296 A1* | 8/2010 | Dahlman | F16C 33/36 384/51 |
| 2014/0348694 A1* | 11/2014 | Baba | C22C 37/10 420/26 |

FOREIGN PATENT DOCUMENTS

| | | | |
|---|---|---|---|
| CN | 101134231 A | | 3/2008 |
| CN | 101589661 A | | 12/2009 |
| CN | 103131937 A | * | 6/2013 |
| CN | 203235937 U | | 10/2013 |
| CN | 103834854 A | | 6/2014 |
| CN | 104233051 A | | 12/2014 |
| CN | 105018833 A | | 11/2015 |
| CN | 105132790 A | | 12/2015 |
| CN | 105274423 A | | 1/2016 |
| DE | 3941338 A1 | | 6/1990 |
| JP | 34-4456 B | | 5/1959 |
| JP | 47-013504 S | | 7/1972 |
| JP | 56-13421 A | | 2/1981 |
| JP | 60-34350 U | | 3/1985 |
| JP | 6018248 B2 | | 5/1985 |
| JP | 04-102718 A | | 4/1992 |
| JP | 7-163768 A | | 6/1995 |
| JP | 2002-113551 A | | 4/2002 |
| JP | 2002-356737 A | | 12/2002 |
| JP | 2007-127251 A | | 5/2007 |
| JP | 2011-219846 A | | 11/2011 |
| JP | 2014-98458 A | | 5/2014 |
| JP | 2014-181356 A | | 9/2014 |
| JP | 2015-218349 A | | 12/2015 |

* cited by examiner

SELF-LUBRICATING ROLLING BEARING AND PREPARATION METHOD THEREFOR

TECHNOLOGY FIELD

This invention belongs to the technical field of preparing the rolling bearings, specifically to the self-lubricating rolling bearing and the preparation method therefor.

BACKGROUND

The purpose of bearing is to reduce the friction between the rotating shaft and its still base. Therefore, how to lubricate the bearing properly to reduce the frictional resistance and to lengthen its service time has become an important research direction. There are three kinds of bearing (sliding bearing, rolling bearing and self-lubricating rolling bearing) on the market nowadays. For the sliding bearing, a great frictional resistance exists, making it unfit for the application in the situation where there is a great rotational speed. The rolling bearing made from bearing steels can greatly reduce the frictional resistance in them, and find a wide application in the industry. As mentioned above, there is larger frictional resistance in sliding bearing than that in rolling bearing, but the sliding bearing can be self-lubricated by the graphite bars embedded in its inner cylinder wall, thus its frictional coefficient can be decreased significantly. On the other hand, the rolling bearing needs to be lubricated regularly. Lubricating the rolling bearing regularly would be impractical in some special application such as: 1) the application in metallurgical machinery. Usually, the metallurgical machineries run at a high temperature, thus the rolling bearing in them needs to be lubricated periodically. According to the specifications for bearing, the time interval for injecting lubricants into bearing depends on the temperature at which the bearing is running. When its running temperature is below 70° c., the time interval is same and was defined as the standard time interval. When its running temperature is over 70° c., the time interval will be shortened. Furthermore, the higher the running temperature is, the shorter the time interval is. For example, when its running temperature is about 100° c., the time interval is only one quarter of the standard time interval; when its running temperature is about 120° c., the time interval is only one-tenth of the standard time interval. It is very tedious to lubricate the rolling bearing so frequently. 2) the rolling bearing mounted in the heart of a large equipment. In order to lubricate the rolling bearing, the large equipment needs to be disassembled. Disassembling the large equipment requires a lot of work. 3) the application in transportation vehicle. It is hard to track and perform maintenance after the vehicle leaves the manufacture. In such applications mentioned above, because it is not easy to lubricate the rolling bearing, the bearing often runs under a condition of dry friction, and will fail before its life expectancy. In addition, the delicate reducer in the precise machinery such as a robot requires a great acceleration torque and a great instantaneous acceleration torque. The adhesion caused by the use of lubricating grease on the flexible bearings (one kind of the rolling bearings) in the reducer will jeopardize these accelerations.

In order to overcome the disadvantages of rolling bearing listed above, some rolling bearings, for example the Powder-Metallurgy Oil-Impregnated bearing (PMOI bearing) and the rolling bearing made from the Austempered Ductile Iron (ADI), were developed and sold on the market. For PMOI bearing, the oil stored in the holes of PMOI bearing can lubricate the bearing, making it a self-lubricating bearing. But the strength of PMOI bearing is low, and particles which are the building blocks to be sintered into the bearing can easily slip away from the bearing and turn into abrasive grains for the bearing, so the wear in the bearing is serious. When the rolling bearing was made from the ADI materials prepared by conventional casting, its metal-matrix grains are coarse and its graphite is poor (for example, the size of graphite nodules is large and the spheroidization percentage of graphites is low), thus the graphite nodules will result in the formation of point-contacting fatigue cracks. In addition, many casting defects such as blowholes, sand inclusions, slag inclusions, shrinkage cavities and shrinkage porosity also exist in the ADI castings prepared by conventional casting, they also strongly lead to the formation of fatigue cracks.

SUMMARY OF THE DISCLOSURE

One of the aims of the invention is to supply a self-lubricating rolling bearing. The bearing will not fail before its expected lifespan even if it suffers from poor lubrication or even dry-friction when it runs under such conditions as low rotating speed, high operating temperature, infrequent lubrication and suffering from the constant impact.

The other aim of the invention is to supply a process to produce the self-lubricating rolling bearing mentioned above.

The self-lubricating rolling bearing presented in the embodiment of the invention is composed of the four parts: an inner ring, an outer ring, a cage and balls. The four parts are assembled into a rolling bearing through a conventional process. The chemical compositions in the inner rings and the outer rings are 3.3-3.5% C (except for some special declaration, all of percent mentioned in the invention are weight percentage), 2.7-2.9% Si, 0.3-0.5% Mn, 0.3-0.5% Cr, ≤0.05% S, ≤0.05% P, 0.03-0.045% Residual Mg, and the remainder Fe. The total percent of above chemical composition is 100%.

The process to produce the self-lubricating rolling bearing are also supplied in the embodiment of invention. The processes are listed as follow:

The first step: the pig iron, steel scraps and ferroalloy are used as raw materials to prepare the parts: the inner ring, the outer ring and the cage. The percentage and the weight of pig iron, steel scraps and ferroalloy is decided according to the compositions in every part respectively, and then they are molten together in an induction heating furnace. The chemical compositions in the molten iron for the inner rings and the outer rings are 3.4%-3.7% C, 1.5%-1.7% Si, 0.3%-0.5% Mn, 0.3%-0.5% Cr, ≤0.05% S, ≤0.05% P and the remainder Fe. The total percent of the chemical compositions is 100%. After an inoculation process and a spheroidizing process are carried out on the molten iron, the final percentage of Si and the residual Mg in the molten iron for the rings are 2.7%-2.9%, 0.03%-0.045% respectively. The chemical compositions in the molten iron for the cages are 3.3%-3.5% C, 1.8%-2.0% Si, 0.2%-0.3% Mn, ≤0.05% S, ≤0.05% P and the remainder Fe. The total percent of the chemical compositions is 100%. After an inoculation process and a spheroidizing process are executed on the molten iron respectively, the final percentage of Si and the residual Mg in the molten iron are 2.8%-3.1%, 0.03%-0.045% respectively.

The second step: the molten iron above is made into spheroidal graphite cast iron tubes with upward vertical continuous casting process.

The third step: A spheroidizing annealing process is applied on the spheroidal graphite cast iron tubes, and then the graphite morphology in the tubes is inspected under the microscope with 100× magnification. The graphite morphology in the profiles must meet the following requirements: its spheroidization rate is above 90% and the number of graphite nodule per square millimeter is greater than 500.

The fourth step: after the spheroidizing annealing, the tubes are made into the inner rings and the outer rings with the turning and grinding processes. The austempering process is carried out after the turning process and before the grinding process.

The fifth step: some tests are carried out on the rings. The tests are listed as follow:

1) The spheroidization rate of graphite is above 93%
2) The number of graphite nodule per square millimeter is greater than 500
3) The hardness of ferrite in the tubes is more than twice that of ferrite in the castings produced by a conventional casting.
4) The hardness of the tubes is no less than HRC48.

The sixth step: the tubes obtained from the second step are annealed, and then are made into cages by machining process.

The seventh step: the inner rings and the outer rings from the fifth step, the cages from the sixth step and the balls purchased on the market are assembled into self-lubricating rolling bearings through conventional process.

Further, the inside diameter of the tubes obtained from the second step is 4-5 mm smaller than the inside diameter of the inner rings or the outer rings, and the outside diameter of tubes is 3-4 mm larger than that of the inner rings or the outer rings.

Further, the crystallizer used in the upward vertical continuous casting process in the second step is made up of an inner cylinder and an outer cylinder. For the outer and inner cylinder, an upper ring flange and a lower ring flange are fitted to its top and its bottom respectively. Moreover, the outer cylinder of upper part is fitted with two water inlet taps and its lower part is fitted with two water outlet taps. Two-spiral-ribbed slabs are obtained in the exterior of the inner cylinder by the turning process. The inner cylinder is installed in the outer cylinder and then they are fitted together, creating a crystallizer with a two-spiral-continuous water channel Further, the spheroidizing annealing process described in the third step consists of the following steps:

Step a. The spheroidal graphite iron tubes are heated to the temperature which is 50° C. above the eutectoid temperature of Fe-graphite alloy in a well or box heat treatment furnace, and then kept at the temperature for a time between the range of 55 min and 65 min.

Step b. After step "a", the tubes are cooled down to the temperature which is 50° C. below the eutectoid temperature of Fe-graphite, and then kept at the temperature for a time between the range of 55 and 65 min.

Step c. Repeat step "a" and step "b" at least two times.

Step d. Next to step "c", the tubes are cooled down to the temperature between the range of 595° C. and 605° C. in the furnace. After that, the tubes are taken out of the furnace and cooled to room temperature.

Further, the austempering process described in the fourth step is done according to the following requirements. The inner rings and the outer rings are heated to a temperature between 880° C. and 900° C., and the holding time at the temperature is in the range of 50 min to 60 min when the wall thickness of rings is less than 10 mm. When the wall thickness of rings is larger than 10 mm, as the wall thickness of rings increases by 1 mm, the holding time increases by 2 min. When the holding time is over, the rings will be immerged into a hot quench bath with a temperature between 230° C. and 250° C., and then kept in the bath for a time between 40 min and 50 min. After that, the rings are taken out of the bath, cooled to room temperature, and subsequently immerged into water to clear off the salt on their surface.

Further, the annealing described in sixth step is carried out as following: the tubes are heated to the eutectoid temperature 760° C. in a well or box heat treatment furnace, and then kept at temperature for 120 min. Subsequently, the tubes are cooled down to 500° C. in the furnace. After that, the tubes are taken out of the furnace and cooled down to room temperature.

Further, the hardness of the balls used in the seventh step is 1-2HRC higher than that of the inner and outer rings.

Comparing with the rolling bearing available on the market, the benefits resulted from the rolling bearing introduced in the invention are listed as following Hollow ductile cast irons profiles (tubes) with an ultrafine microstructure are adopted as the raw materials to manufacture these parts of rolling bearings such as inner rings, outer rings and cages. A spheroidize annealing process and an austempering process are taken on the profiles successively, thus the profiles with an excellent mechanical properties are achieved and are made into the inner rings, the outer rings and the cages. Finally, the inner rings, the outer rings, the cages and the purchased balls are assembled into the self-lubricating rolling bearings. Comparing with the conventional rolling bearings, the materials, the heat-treatment processes and the hardness of the rings of rolling bearing introduced in the invention have improved significantly. The purpose of these alterations is to combine the advantage of rolling bearing with the advantage of self-lubricating sliding bearing, and then to produce a self-lubricating rolling bearing (which can run effectively for a long time under these operating conditions such as at a low rotating speed, at a higher temperature, being difficult to lubricate and suffering from frequent impact) for manufacturing industry such as metallurgical machinery.

BRIEF DESCRIPTION OF THE DRAWINGS

In order to explain more clearly the technical scheme described in the embodiment of the invention, a brief description about the figures used in the embodiment of the invention is presented below. What should be understood is that the figures listed below only presented some embodiments of the invention, and they should not be taken as the limitation of the invention. On the basis of the figures, the ordinary skilled engineers in the art can deduce other interrelated figures without any creative works.

Figure 1:
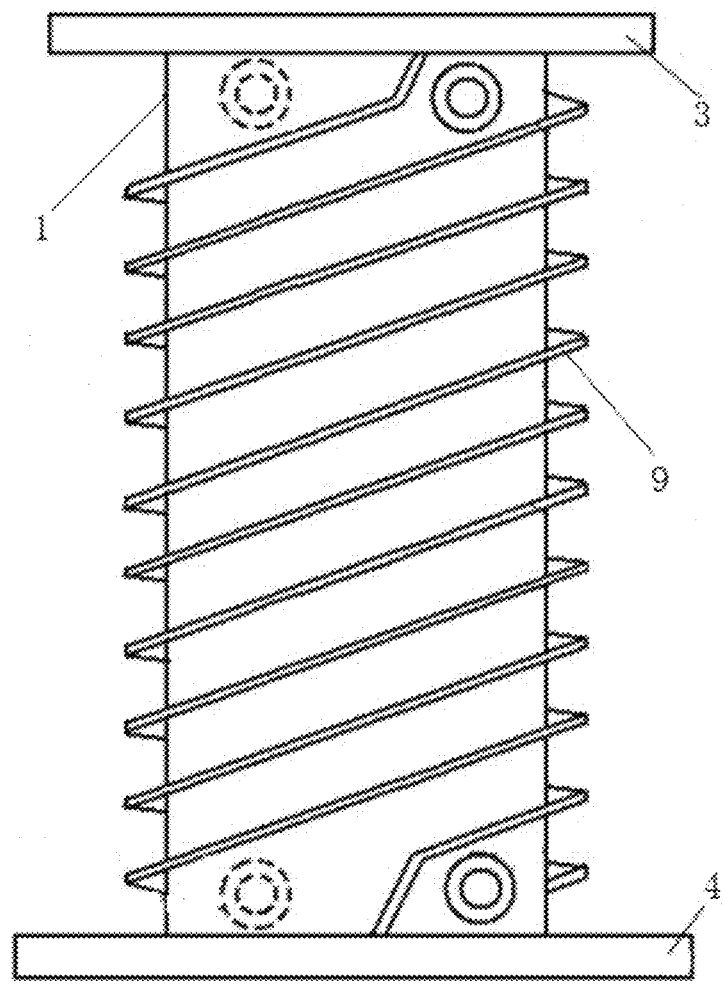
FIG. 1 is the illustration of inner cylinder with two-spiral-continuous water channel, which is a part of crystallizer used in the vertical continuous casting in the invention to produce the self-lubricating rolling bearing.

1 inner cylinder, 2 outer cylinder, 3 upper flange, 4 lower flange, 5 water inlet tap I, 6 water inlet tap II, 7 water outlet tap I, 8 water outlet tap II, 9 two-spiral-ribbed slab

DETAILED DESCRIPTION

In order to clearly understand the purpose, the technical scheme and the advantage of the embodiment of the invention, a clear and complete description on the technical scheme presented in the embodiment of invention is listed as follows. Some conditions which are not mentioned specifically in the embodiment of invention are carried out according to routines or on suggestions provided by their manufacturers. The reagents or the instruments not mentioned specifically all are conventional products which can be purchased on the market.

The disadvantages of rolling bearings made from the conventional nodular graphite cast iron or from ADI are as follows:

1) the main factor that causes the rolling bearing failure is the point contact fatigue when they run under ordinary service conditions. The graphite in the nodular graphite cast iron can act as lubricant for the bearing, but because of its low strength, actually, it is a small pit in the metal matrix of cast iron. If the graphite nodules in the cast iron are not round and not small, when a periodic force is applied on them, a great stress will be generated on the edges of graphite nodules, thus the edges will be the initiation areas for fatigue cracks. Actually, the graphite nodules in the cast iron are not round and not small when the cast iron is prepared through conventional casting, thus it is unavoidable that the edges of graphite nodules will be fatigue cracks initiation areas.

2) lots of casting defects such as blowholes, sand inclusions, slag inclusions, and shrinkage porosity exist in the castings produced through conventional casting, thus the density of the castings is much lower than that of castings made from the forged rolling bearing steel.

3) the microstructure in the nodular graphite cast iron produced through conventional casting is coarse, thus when the austempering is applied on the casts, the time held at the quenching temperature and the austempered time will become longer (about 1.5 Hour), and then the efficiency of heat treatment will become lower, the cost on the production will increase and the quality of the products will not be the best.

4) the microstructure in the profiles produced through a horizontal continuous casting is fine, and the casting defects in the profiles are close to zero, but the profiles is solid, not hollow, so the shape of profiles does not meet the need of the shape of bearing ring.

The problems above are all resolved in the invention, thus a self-lubricating rolling bearing which can avoid the problem above is obtained.

The invention will be presented in detail as follow through combining the attached figures with the concrete implementations.

The self-lubricating rolling bearing given in the invention consists of four parts: the inner ring, the outer ring, the cage and the balls. The four parts are assembled into a rolling bearing through a conventional process. The chemical compositions in the cast iron for the inner rings and the outer rings are 3.3-3.5% C, 2.7-2.9% Si, 0.3-0.5% Mn, 0.3-0.5% Cr, ≤0.05% S, ≤0.05% P, 0.03-0.045% Residual Mg, and the remainder Fe. The total percent of the chemical compositions is 100%.

When the self-lubricating rolling bearings given in the invention run under such conditions as low rotating speed, high operating temperature, difficult to lubricate and suffering from the frequent impact, they will not have the problems in the conventional rolling bearings such as the premature failure, poor lubrication and dry-friction.

Figure 2:
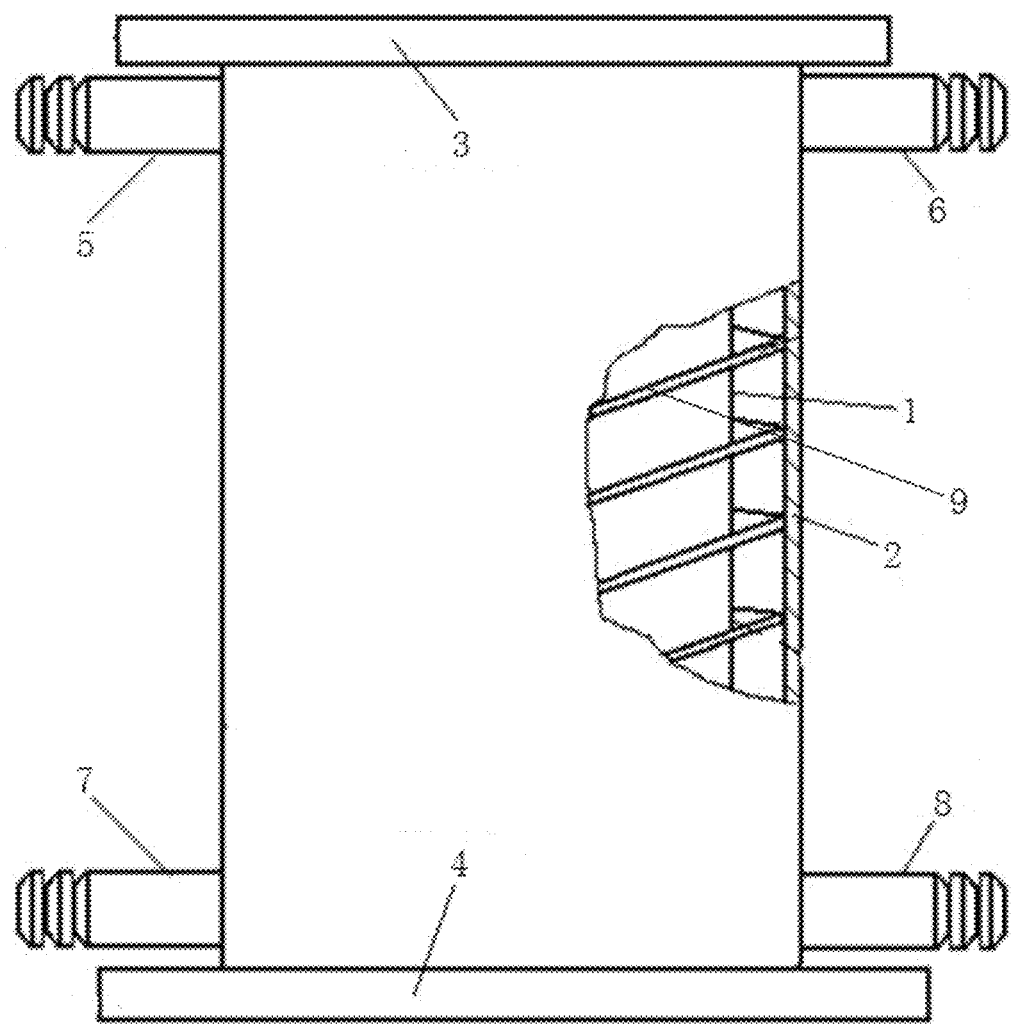
FIG. 2 is the illustration of assemble diagram for the crystallizer used in the vertical continuous casting to produce the self-lubricating rolling bearing introduced in the invention.

A new process is also supplied to manufacture the self-lubricating rolling bearing mentioned above. The process is also carried out in the patent of "the equipment for produce hollow metal profiles with low plasticity by continuous casting" (patent no. Zl200710018928.2, Publication no. 101134231, and publication date Mar. 5, 2008). The differences in the equipment between in the invention and in the patent (no. ZL200710018928.2) are the structure of crystallizer. In the invention, the structure of crystallizer is illustrated in the FIG. 1 and FIG. 2. From the figures, it can be seen that the structure of the crystallizer in the invention is of two-spiral water channel, and its detail structure is described as following: the crystallizer is made up of an inner cylinder (marked with "1") and an outer cylinder (marked with "2"). The inner cylinder is in the outer cylinder and then they are fitted with each other. At the bottom of the two cylinders and at the top of the two cylinders, a ring flange marked with "3" (at the top of cylinder) and "4" (at the bottom of cylinder) are fitted with the cylinder respectively. Moreover, there are two water inlet taps (marked with "I5" or "I16") in the upper of outer cylinder and two water outlet taps (marked with "I7" or "II8") in the lower of outer cylinder respectively. Two-spiral-ribbed slabs are obtained in the exterior of the inner cylinder by turning. The two cylinders are fitted together to create a two-spiral-continuous water channel. The two-spiral water channel can supply the crystallizer with a much greater cooling capacity than the water channel in the patent no. Zl200710018928.2. A great cooling capacity can ensure that the number of graphite nodule per square millimeter in the cast iron is greater than 500. A graphite cylinder is inlaid in the inner surface of the inner cylinder, and its inner surface is in contact with the molten iron directly, thus the molten iron can be cooled and solidified on its inner surface to form the hollow profiles. Moreover, the self-lubricating property of the graphite allows the profile to be drawn out of the crystallizer.

A process to prepare the self-lubricating rolling bearing is carried out according to the steps as following.

The first step: the pig iron, steel scraps and ferroalloy are weighted according to the compositions in every part respectively and then are molten together in an induction heating furnace. The chemical compositions in the raw molten iron for the inner rings and the outer rings are 3.4%-3.7% C, 1.5%-1.7% Si, 0.3%-0.5% Mn, 0.3%-0.5% Cr, ≤0.05% S, ≤0.05% P and the remainder Fe. The total percent of the chemical compositions is 100%. Then an inoculation process and a spheroidizing process are applied on the molten iron, thus the final percentage of Si and the residual Mg in the molten iron for the rings are 2.7%-2.9%, 0.03%-0.045% respectively. The chemical compositions for the cages are 3.3%-3.5% C, 2.8%-3.1% Si, 0.2%-0.3% Mn, ≤0.05% S, ≤0.05% P, 0.03%-0.045% Residual Mg and the remainder Fe. The total percent of the chemical compositions is 100%.

The second step: the molten iron above is made into spheroidal graphite cast iron tubes with different diameters and different wall thickness with upward vertical continuous casting process. The inside diameter of the tubes is 4-5 mm smaller than the inside diameter of the inner rings or the outer rings, and the outside diameter of tubes is 3-4 mm larger than that of inner rings or outer rings. The allowance for machining the cage profiles in its internal and external diameters is also 4-5 mm and 3-4 mm respectively The third step: spheroidizing annealing is carried out on the nodular graphite cast iron tubes, and then the graphite morphology in the tubes is inspected. The graphite morphology must meet the requirements: its nodularity above 90% and the number of graphite nodule per square millimeter greater than 500.

Figure 3:
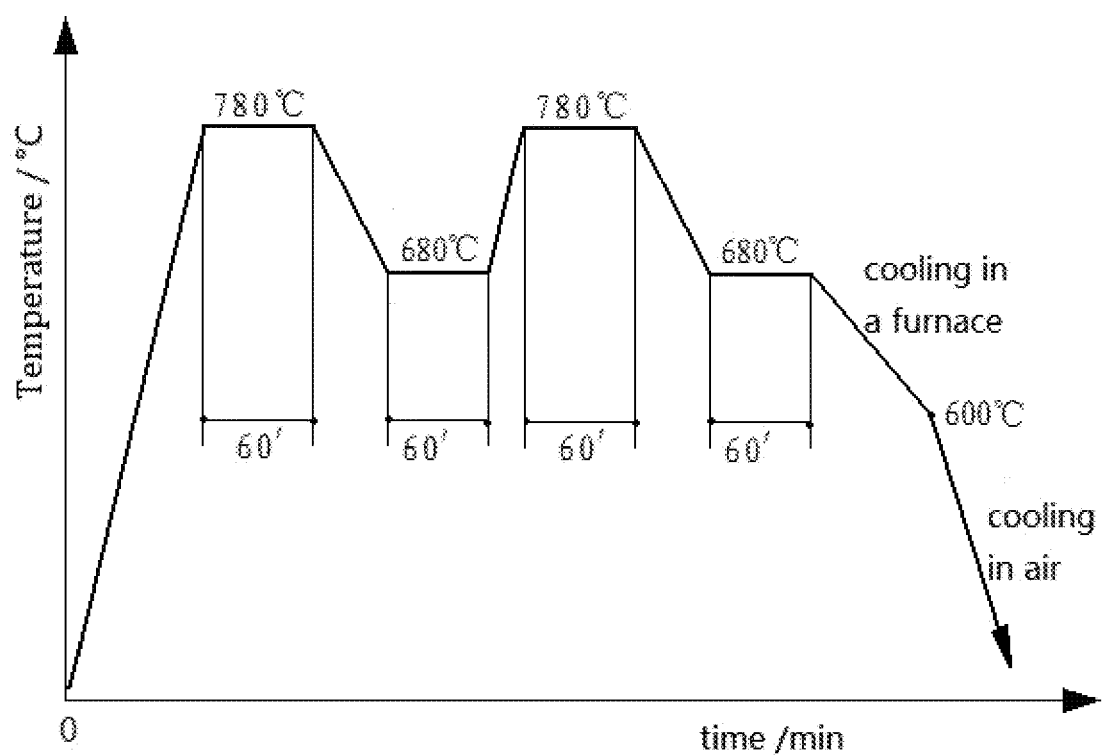
FIG. 3 is a heating curve of the cyclic spheroidizing annealing for the inner rings and the outer rings used to be assembled into the self-lubricating bearing in the invention.

Just as shown in FIG. 3, the spheroidizing annealing is composed of the following steps:

Step a, the spheroidal graphite iron tubes are heated to their eutectoid temperature 780° C., and then kept at the temperature for a time between the range of 55 min and 65 min. After that, the tubes are cooled down to their eutectoid temperature 680° C., and then kept at the temperature for a time between the range of 55 and 65 min.

Step b, repeat the step "a" at least twice.

Step c, after the step b, the tubes are cooled down to a temperature between 595° C. and 605° C. in the furnace, and then the tubes are taken out of the furnace and cooled down to room temperature.

The fourth step: after the spheroidizing annealing, the tubes are made into the inner rings and the outer rings through cutting, turning and grinding. In the machining processes, an austempering process is carried out after the process of turning and before the process of grinding.

Figure 4:
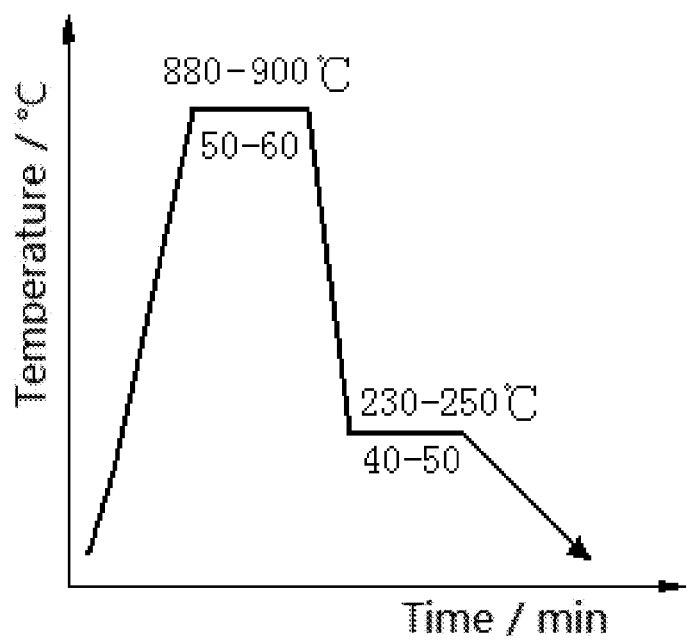
FIG. 4 is the heating curve of the austempering for the inner rings and the outer rings used to be assembled into the self-lubricating bearing in the invention

As shown in FIG. 4, the austempering process is done according to the following requirements. The inner rings and the outer rings are heated to a temperature between 880° C. and 900° C., and the holding time at the temperature is in the range of 50 min to 60 min when the wall thickness of rings is less than 10 mm. When the wall thickness of rings is larger than 10 mm, as the wall thickness of rings increases by 1 mm, additional 2 min are added to the holding time. When the holding time is over, the rings are taken out of the furnace and then quickly immerged into a hot quench bath with a temperature between 230° C. and 250° C., and kept in the bath for a time between 40 min and 50 min. After that, the rings are taken out of the bath, cooled to room temperature, and subsequently immerged into water to clear off the salt on their surface.

The fifth step: some checks are performed to the rings. The checks include the nodularity of graphite, the number of graphite nodules and the hardness. The nodularity of graphite in the rings is be above 93%, the number of graphite nodule per square millimeter is greater than 500, and the hardness of ferrite in the rings is more than twice that of ferrite in the casts produced by a conventional casting, and the hardness of the tubes is no less than HRC48.

Figure 5:
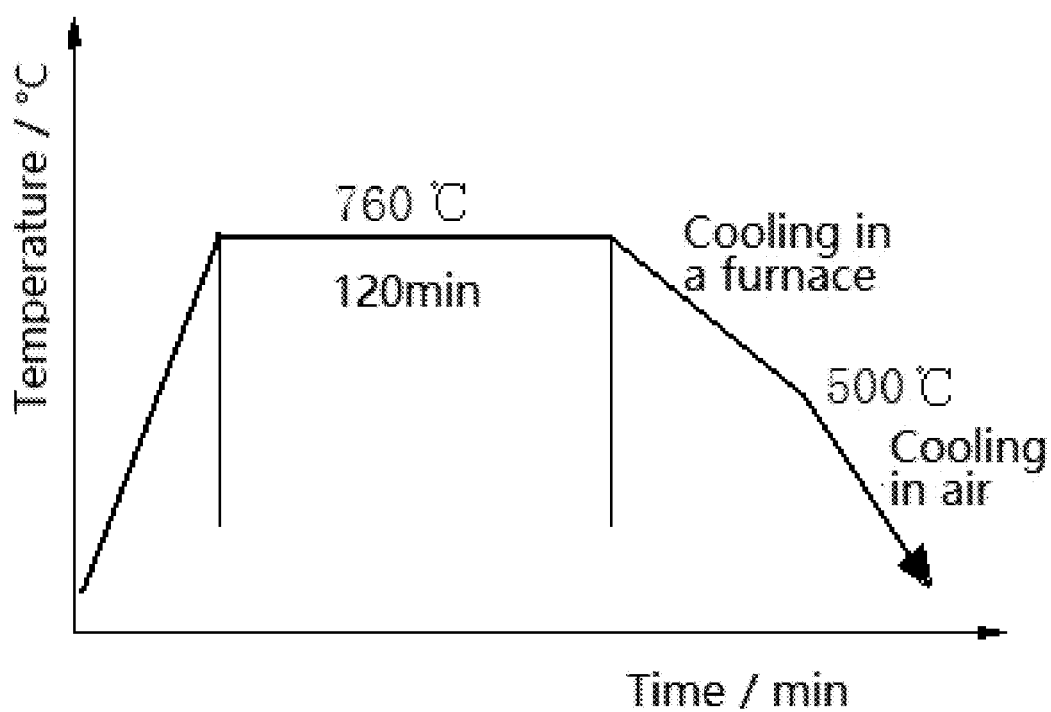
FIG. 5 is the heating curve of the annealing for the cages used to be assembled into the self-lubricating bearing in the invention.

The sixth step: the hollow profiles (tubes) obtained from the second step are annealed as shown in FIG. 5. The detailed processes of annealing are as following: the profiles are heated to their eutectoid temperature 760° C. in a furnace, and then kept at the temperature for 120 min. Subsequently, the profiles are cooled down to 500° C. in the furnace. After that, the profiles are taken out of the furnace and cooled down to room temperature in air. Finally, the profiles are made into cages by machining. The cast iron for the cages is equivalent to QT400-18.

The seventh step: the inner rings and the outer rings resulted from the fifth step, the cages from the sixth step and the balls from purchase are assembled into self-lubricating rolling bearings via conventional process. The hardness of the balls is 1-2HRC higher than that of the inner and outer rings.

Figure 6:
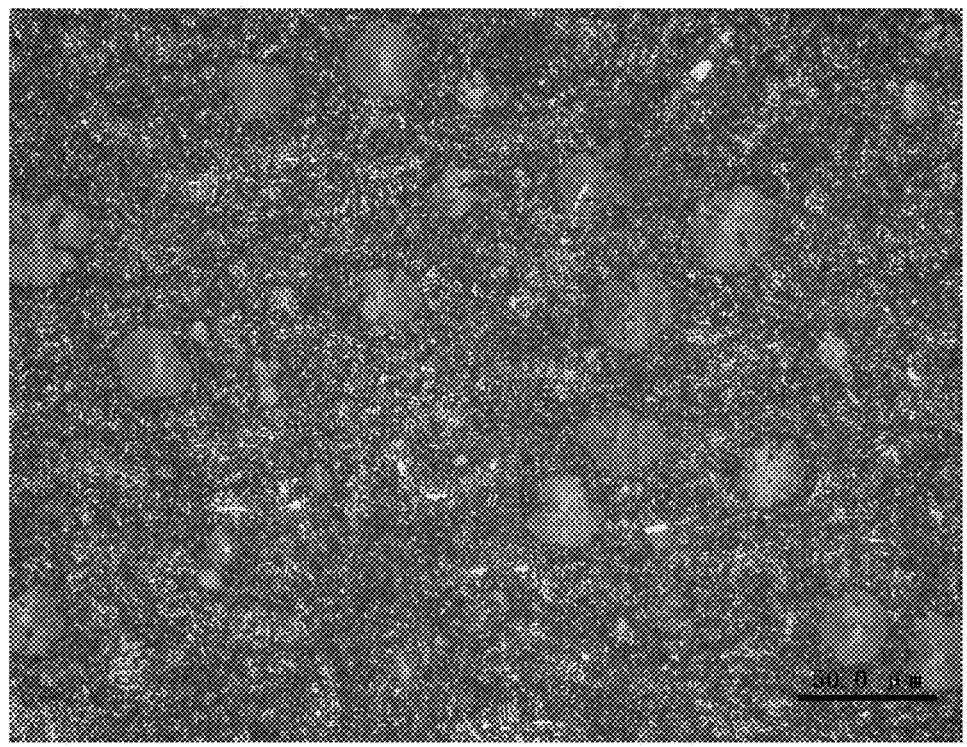
FIG. 6 is pictures of the metallographic microstructure for the inner rings and outer rings used to be assembled into the self-lubricating bearings in the invention.

Comparing with the technology available to produce the rolling bearing, the advantages of the technology in the invention are that:

The first advantage: the regular, dense and fine graphite nodules not only can supply the lubricant for the running of rolling bearing, but also can avoid the damage resulted from the point-contacting fatigue. As shown in FIG. 6, the nodularity is above 90% in the tubes produced via upwards vertical continuous casting. Moreover, the roundness of the graphite nodules is improved further, thus the probability of fatigue cracks resulted from the edge and the sharp corner of graphite caves is reduced after the tubes are austempered. The number of graphite nodules is so great that it is up to 500-700/mm$^2$. Such dense and fine graphite nodules make the cross-sectional area of caves coming from the graphite nodules very tiny, and the area of caves is only several tenths of that from the graphite nodules with grade 7 (the number of graphite nodules was 200/mm$^2$), and also is far smaller than the transient contacting area between the ball and the ring, thus the caves cannot become the initiation of fatigue cracks.

The second advantage: the fine austempering microstructure will supply the inner rings and the outer rings with excellent mechanical properties. The high carbon austenite (whose volume percentage is in the range of 20% to 40% in the microstructure of ring) in the rings will be transformed into martensite when the surface of rings is suffered from the rolling of balls in their working. The transformation of austenite into martensite will increase the hardness of rings and improve their wear resistance. The percent of Si is large in the profiles produced by continuous casting, thus the hardness of the quenched profiles is twice or triple of that of normal ferrite, and then the hardness of rings is improved effectively. Dual-phase microstructure with high-carbon austenite and high-Si ferrite can prevent the crack from propagating quickly, and then increase the impact energy for breaking the parts, and lengthen their serving life.

The third advantage: the ADI materials in the invention consist of nodular graphites and austenite-ferrite microstructure with a high strength and a good toughness. These dense graphite nodules can supply the lubricants for the rolling bearing continuously.

The fourth advantage: low temperature rise. The heat conductivity coefficient of ductile cast iron is about 80 w/(m·k), which is double that of steel (40 w/(m·k)). Thus the heat coming from the friction can be conducted out more quickly. In addition, the resistance of ductile cast iron against tempering is larger than that of steel, and the hardness of ductile cast iron decreases much slower than that of steel when they run at a high temperature. The rolling bearings made from the fine and dense ADI have a low temperature rise, and can run in the circumstance with a temperature no more than that of austempering medium.

The fifth advantage: low noise. The shock absorbing ability of ADI materials is better than that of steel, thus the noise of rolling bearing made from ADI can be cut off intensively.

The sixth advantage: low mass. The mass of ADI with the same volume as that of steel is 10% lighter than that of steel.

The seventh advantage: low allowance for machining. The allowance for machining the casts produced by upwards vertical continuous casting is less than that from forge pieces.

In the invention, the raw materials for the rings of rolling bearing all come from the profiles produced via upwards vertical continuous casting, and all are austempered. Their microstructure is austenite-ferrite with fine and dense nodular graphite in it. Nano-sized austenite and ferrite with rich carbon and silicon will supply high strength, good toughness, great wearing resistance and high compact resistance for the rings of rolling bearing. 20-40% (volume percent) retained austenite in the microstructure not only improve the fatigue performance of rings, but also increase their wear resistance through the deformation hardening of austenite. In the microstructure of rings, the nodularity of graphite is up to 93%, and the number of graphite balls per square millimeter is greater than 500. All of the parameters reach a very high level which is impossible for the conventional ADI. The nodular graphites not only supply the rolling friction with self-lubricant, shock absorption and quick heat-conductivity, but also can avoid initiating the point contacting fatigue crack because of their fine and dense distribution. The bearing balls are made of the traditional bearing steel, and kept their original hardness. The cages are made of the hollow annealed profiles (QT400-18) which are produced by continuous casting. Comparing with the bearing steels, the quenching hardness of ADI in the invention is more than 48 HRC, which is lower than that of quenching bearing steel, thus the bearing made of the ADI cannot run at a great rotating speed. So the application of the self-lubricating rolling bearing is limited for the occasions with a low rotating speed, a higher temperature (but below 200° C.), being difficult to lubricate difficultly and suffering frequent compact.

Exemplary Embodiment 1

The first step: the pig iron, steel scraps and ferroalloy are weighted according to the compositions in every part respectively and then are molten together in an induction heating furnace. The chemical compositions in the raw molten iron for the inner rings and the outer rings are 3.4%-3.7% C, 1.5%-1.7% Si, 0.3%-0.5% Mn, 0.3%-0.5% Cr, ≤0.05% S, ≤0.05% P and the remainder Fe. The total percent of the chemical compositions is 100%. Then an inoculation process and a spheroidizing process are taken on the molten iron, thus the final percentage of Si and the residual Mg in the molten iron for the rings are 2.7%-2.9% Si, 0.03%-0.045% respectively. The chemical compositions for the cages are 3.3%-3.5% C, 2.8%-3.1% Si, 0.2%-0.3% Mn, ≤0.05% S, ≤0.05% P, 0.03%-0.045% Residual Mg and the remainder Fe. The total percent of the chemical compositions is 100%.

The second step: the molten iron above is made into spheroidal graphite cast iron tubes with different diameters and different wall thickness by upward vertical continuous casting respectively. The inside diameter of the tubes is 4-5 mm smaller than the inside diameter of the inner rings or the outer rings, and the outside diameter of tubes is 3-4 mm larger than that of inner rings or outer rings. The allowance for machining the cage profiles in its internal and external diameters is also 4-5 mm and 3-4 mm respectively.

The third step: spheroidizing annealing is carried out on the nodular graphite cast iron tubes, and then the graphite morphology in the tubes is observed. The graphite morphology must be satisfied with the requirement: its nodularity above 90% and the number of graphite nodule per square millimeter greater than 500.

The spheroidizing annealing is composed of the following steps:

Step a, the spheroidal graphite iron tubes are heated to their eutectoid temperature 780° C., and then kept at the temperature for 60 min. After that, the tubes are cooled down to their eutectoid temperature 680° C., and then kept at the temperature for 55 min.

Step b, repeat the step "a" at least twice.

Step c, after the step b, the tubes are cooled down to a temperature 600° C. in the furnace, and then the tubes are taken out of the furnace and cooled down to room temperature.

The fourth step: the spheroidizing-annealed tubes are made into the inner rings and the outer rings through cutting, turning and grinding. In the machining processes, an austempering process was carried out after the process of turning and before the process of grinding.

The austempering process is done according to the following requirements. The inner rings and the outer rings are heated to 880° C., and the holding time at the temperature is 50 min when the wall thickness of rings is less than 10 mm. When the wall thickness of rings is larger than 10 mm, as the wall thickness of rings increases by 1 mm, additional 2 min are added to the holding time. When the holding time is over, the rings are taken out of the furnace and then quickly immersed into a hot quench bath with a temperature of 250° C., and kept in the bath for 40 min. After that, the rings are taken out of the bath, cooled to room temperature, and subsequently immersed into water to clear off the salt on their surface.

The fifth step: some checks are performed to the rings. The checks include the nodularity of graphite, the number of graphite nodules and the hardness. The nodularity of graphite in the rings is above 93%, the number of graphite nodule per square millimeter is greater than 500, and the hardness of ferrite in the rings is more than twice that of ferrite in the casts produced by a conventional casting, and the hardness of the tubes is no less than HRC48.

The sixth step: an annealing is taken on the hollow profiles (tubes) obtained from the second step. The detailed processes of annealing are as following: the profiles are heated to their eutectoid temperature 760° C. in a furnace, and then kept at the temperature for 120 min. Subsequently, the profiles are cooled down to 500° C. in the furnace. After that, the profiles are taken out of the furnace and cooled down to room temperature. Finally, the profiles were made into cages by machining. The cast iron for the cages is equivalent to QT400-18.

The seventh step: the inner rings and the outer rings resulted from the fifth step, the cages from the sixth step and the balls from purchase are assembled into self-lubricating rolling bearings via conventional processes. The hardness of the balls is 1-2HRC higher than that of the inner and outer rings.

Exemplary Embodiment 2

The description of the process supplied in the exemplary embodiment to prepare the self-lubricating rolling bearings is referred to the exemplary embodiment 1. In order to simplify the description, some steps which are not mentioned in the embodiment can be referred to the corresponding steps in the embodiment 1.

In the embodiment, the spheroidizing annealing is composed of the following steps:

Step a, the spheroidal graphite iron tubes are heated to their eutectoid temperature 780° C., and then kept at the temperature for 55 min. After that, the tubes are cooled to their eutectoid temperature 680° C., and then kept at the temperature for 60 min.

Step b, repeat the step "a" at least twice.

Step c, after the step b, the tubes are cooled down to a temperature 595° C. in the furnace, and then the tubes are taken out of the furnace and cooled down to room temperature.

The fourth step: the spheroidizing annealed tubes processed are made into the inner rings and the outer rings through cutting, turning and grinding. In the machining processes, an austempering process is carried out after the process of turning and before the process of grinding.

The austempering process is done according to the following requirements. The inner rings and the outer rings are heated to 900° C., and the holding time at the temperature is 55 min when the wall thickness of rings is less than 10 mm. When the wall thickness of rings is larger than 10 mm, as the wall thickness of rings increases by 1 mm, additional 2 min are added to the holding time. When the holding time is over, the rings are taken out of the furnace and then quickly immerged into a hot quench bath with a temperature of 240° C., and kept in the bath for 45 min. After that, the rings are taken out of the bath, cooled to room temperature, and subsequently immerged into water to clear off the salt on their surface.

The steps not mentioned in the embodiment are same as that in the exemplary embodiment 1.

Exemplary Embodiment 3

The description of the process supplied in the exemplary embodiment to prepare the self-lubricating rolling bearings is referred to the exemplary embodiment 1. In order to simplify the description, some steps which are not mentioned in the embodiment can be referred to the corresponding steps in the embodiment 1.

In the embodiment, the spheroidizing annealing is composed of the following steps:

Step a, the spheroidal graphite iron tubes are heated to their eutectoid temperature 780° C., and then kept at the temperature for 65 min. After that, the tubes are cooled to their eutectoid temperature 680° C., and then kept at the temperature for 65 min.

Step b, repeat the step "a" at least twice.

Step c, after the step b, the tubes are cooled down to a temperature of 605° C. in the furnace, and then the tubes are taken out of the furnace and cooled down to room temperature.

The fourth step: the spheroidizing annealed tubes processed are made into the inner rings and the outer rings through cutting, turning and grinding. In the machining processes, an austempering process is carried out after the process of turning and before the process of grinding.

The austempering process is done according to the following requirements. The inner rings and the outer rings are heated to 890° C., and the holding time at the temperature is 60 min when the wall thickness of rings is less than 10 mm. When the wall thickness of rings is larger than 10 mm, as the wall thickness of rings increases by 1 mm, additional 2 min are added to the holding time. When the holding time is over, the rings are taken out of the furnace and then quickly immerged into a hot quench bath with a temperature of 230° C., and kept in the bath for 50 min. After that, the rings are taken out of the bath, cooled to room temperature, and subsequently immerged into water to clear off the salt on their surface.

The steps not mentioned in the embodiment are same as that in the exemplary embodiment 1.

The invention claimed is:

1. A self-lubricating rolling bearing comprising:
   an inner ring;
   an outer ring;
   a cage; and
   balls,
   wherein the inner ring and the outer ring have a composition comprising:
     3.3-3.5 wt. % of C;
     2.7-2.9 wt. % of Si;
     0.3-0.5 wt. % of Mn;
     0.3-0.5 wt. % of Cr;
     ≤0.05 wt. % of S;
     ≤0.05 wt. % of P;
     0.03-0.045 wt. % of Mg; and
     a remaining wt. % of Fe,
   wherein the inner ring and the outer ring have a spheroidization rate ≥93% and a density of graphite nodule ≥500 per mm², and
   wherein a hardness of the balls is HRC 1-2 greater than a hardness of the inner ring and the outer ring.

2. The self-lubricating rolling bearing of claim 1, wherein the cage has a composition comprising:
   3.3%-3.5 wt. % of C;
   2.8-3.1 wt. % of Si;
   0.2-0.3 wt. % of Mn;
   <0.05 wt. % of S;
   <0.05 wt. % of P;
   0.03-0.045 wt. % of Mg; and
   a remaining wt. % of Fe.

3. The self-lubricating rolling bearing of claim 1, wherein the inner ring and the outer ring have-a hardness no less than HRC 48.

* * * * *